United States Patent
Chen

(10) Patent No.: US 6,408,961 B1
(45) Date of Patent: Jun. 25, 2002

(54) APPARATUS FOR DRIVING HAND-OPERATED WHEELCHAIR

(76) Inventor: Sen-Jung Chen, No. 236, Sec. 3, Ho-Ping W. Rd., Taipei City (TW)

( * ) Notice: Subject to any disclaimer, the term of this patent is extended or adjusted under 35 U.S.C. 154(b) by 0 days.

(21) Appl. No.: 09/678,588

(22) Filed: Oct. 3, 2000

(51) Int. Cl.⁷ ................................................. B62D 5/04
(52) U.S. Cl. ....................... 180/6.5; 180/65.1; 180/907; 180/65.6
(58) Field of Search ................................. 180/65.1, 907, 180/294, 298, 221, 65.6, 6.48, 6.5; 280/250.1, 304.1; 297/DIG. 4

(56) References Cited

U.S. PATENT DOCUMENTS

| | | | |
|---|---|---|---|
| 4,961,473 A | * | 10/1990 | Jones ......................... 180/65.1 |
| 5,012,165 A | * | 4/1991 | Lautzenhiser et al. ......... 318/53 |
| 5,186,269 A | * | 2/1993 | Avakian et al. .............. 180/6.5 |
| 5,197,559 A | * | 3/1993 | Garin, III et al. .......... 180/65.1 |
| 5,222,567 A | * | 6/1993 | Broadhead et al. ........... 180/15 |
| 6,050,356 A | * | 4/2000 | Takeda et al. ............. 180/65.1 |
| 6,230,831 B1 | * | 5/2001 | Ogata et al. ............... 180/65.1 |
| 6,302,226 B1 | * | 10/2001 | Kanno et al. ................ 180/6.5 |

* cited by examiner

Primary Examiner—J. J. Swann
Assistant Examiner—J. Allen Shriver
(74) Attorney, Agent, or Firm—Ladas & Parry

(57) ABSTRACT

An apparatus for driving electrically a hand-operated wheelchair includes two driving devices, a power supply device, and a control device. Each driving device includes a motor unit provided with a motor shaft and a transmission unit that is adapted to be mounted removably on a respective one of the wheels of the wheelchair so as to transfer rotation of the motor shaft to the respective one of the wheels in such a manner that each of the wheels rotates at a speed smaller than that of the respective motor shaft. The power supply device is adapted to be disposed on a chair frame for supplying electrical power to the motor units. The control device controls speed ratios of the motor shafts of the motor units so as to be adapted to steer the wheelchair.

6 Claims, 7 Drawing Sheets

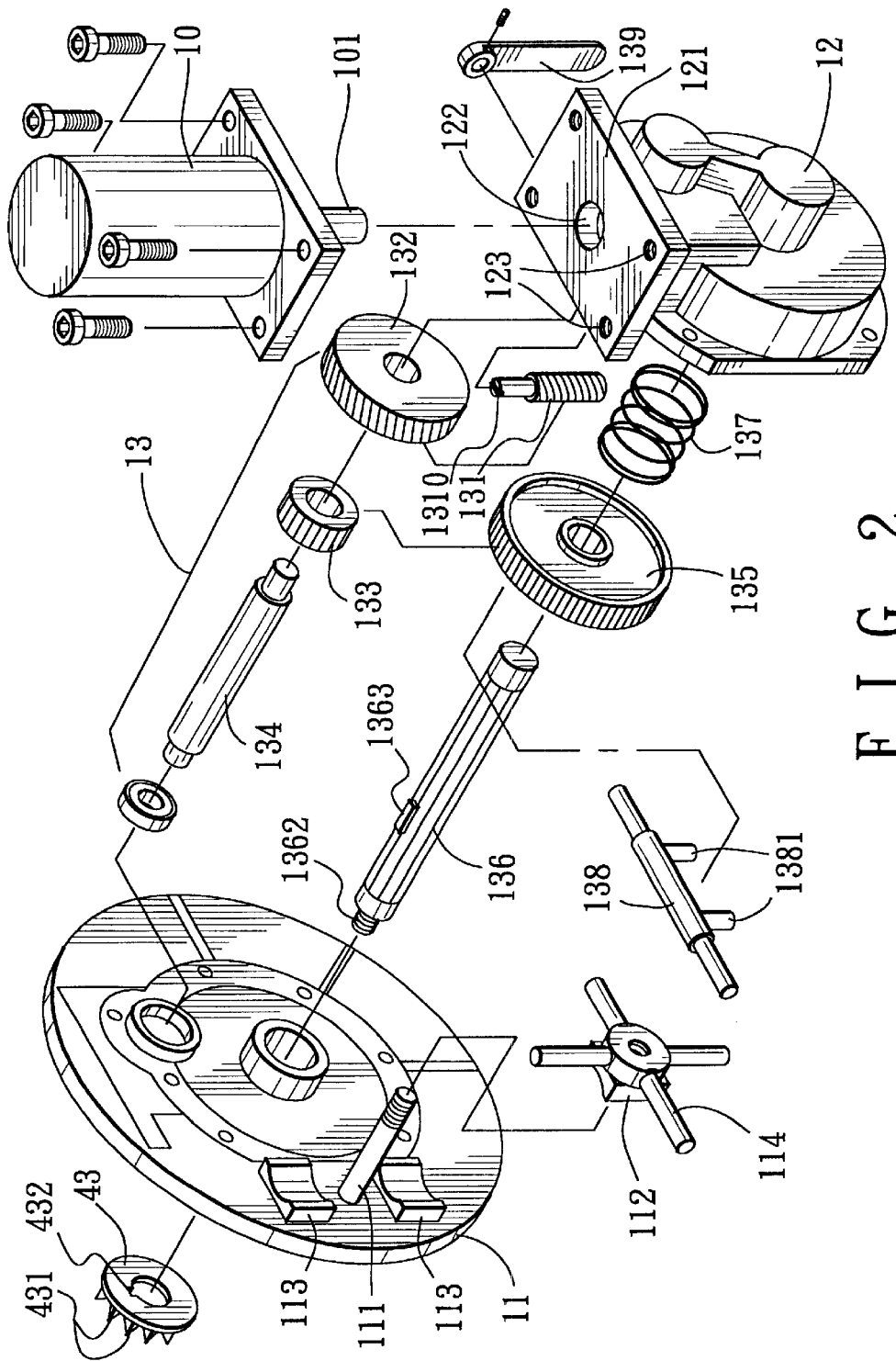
F I G. 2

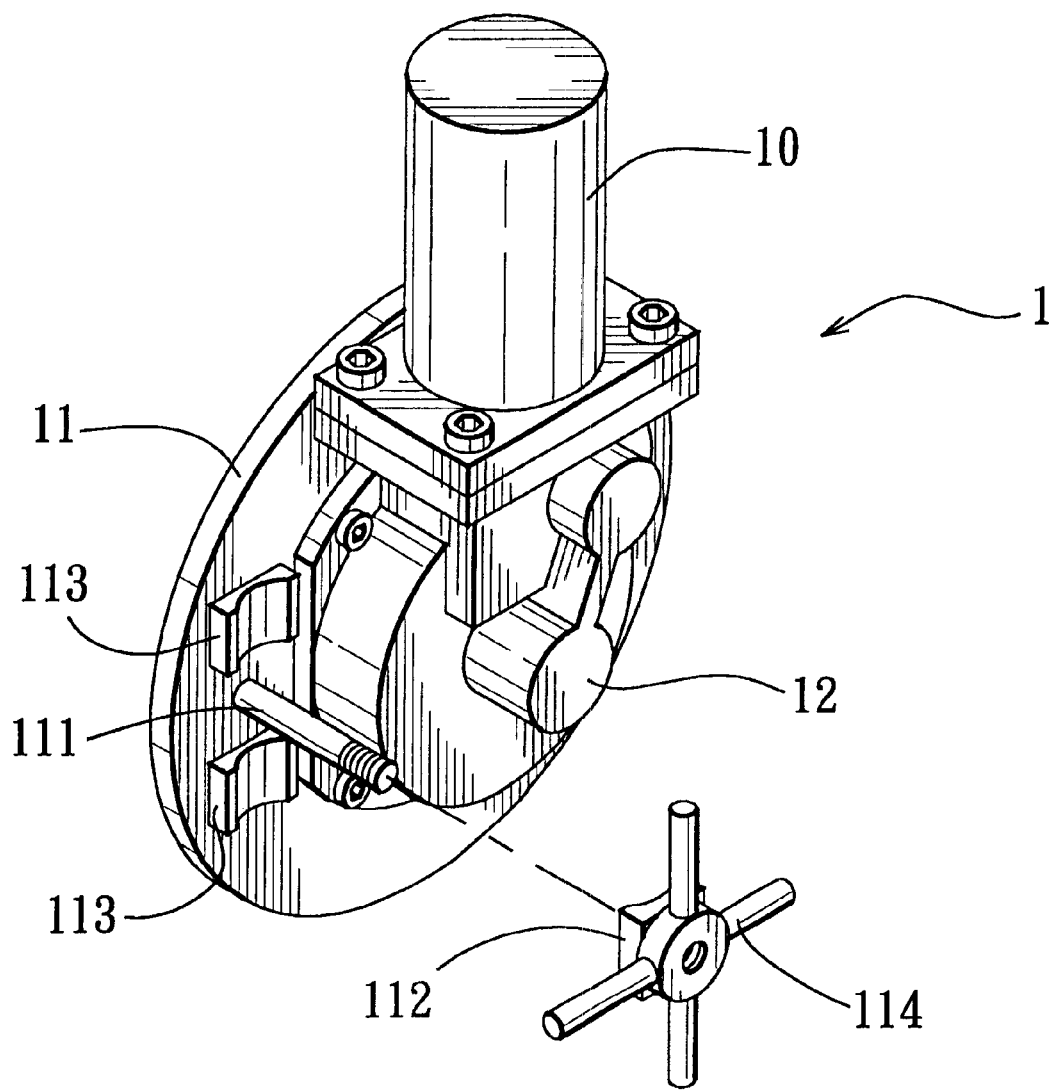
F I G. 3

APPARATUS FOR DRIVING HAND-OPERATED WHEELCHAIR

BACKGROUND OF THE INVENTION

1. Field of the Invention

The invention relates to an apparatus for driving a wheelchair, more particularly to an apparatus that enables a hand-operated wheelchair to be power-driven.

2. Description of the Related Art

Conventional wheelchairs include hand-operated and power-operated ones, which are in general not compatible in construction. If the user of a hand-operated wheelchair wishes to switch to a power-operated one, he/she has to buy a new one, which is wasteful.

SUMMARY OF THE INVENTION

Therefore, the main object of the present invention is to provide an apparatus for driving electrically a hand-operated wheelchair.

Accordingly, an apparatus of the present invention is adapted for driving electrically a hand-operated wheelchair. The wheel chair includes a chair frame that has two vertical rod portions and two axle holes formed through the rod portions, respectively, and two wheels that are mounted rotatably on two opposite sides of the chair frame. Each of the wheels has a hub having two opposite sides, each of which is provided with a plurality of pairs of spokes that extend therefrom. The hub and each pair of the spokes define cooperatively a generally trapezoidal space thereamong in a respective one of the wheels. The apparatus of this invention includes two driving devices, a power supply device, and a control device. Each driving device includes a motor unit provided with a motor shaft and a transmission unit that is adapted to be mounted removably on a respective one of the wheels so as to transfer rotation of the motor shaft to the respective one of the wheels in such a manner that each of the wheels rotates at a speed smaller than that of the respective motor shaft. The power supply device is adapted to be disposed on the chair frame for supplying electrical power to the motor units. The control device controls speed ratios of the motor shafts of the motor units so as to be adapted to steer the wheelchair.

BRIEF DESCRIPTION OF THE DRAWINGS

Other features and advantages of the present invention will become apparent in the following detailed description of the preferred embodiment with reference to the accompanying drawings, of which:

FIG. 2 is an exploded perspective view of the preferred embodiment;

FIG. 3 is a fragmentary partly exploded perspective view of a driving device of the preferred embodiment;

DETAILED DESCRIPTION OF THE PREFERRED EMBODIMENT

Figure 1:
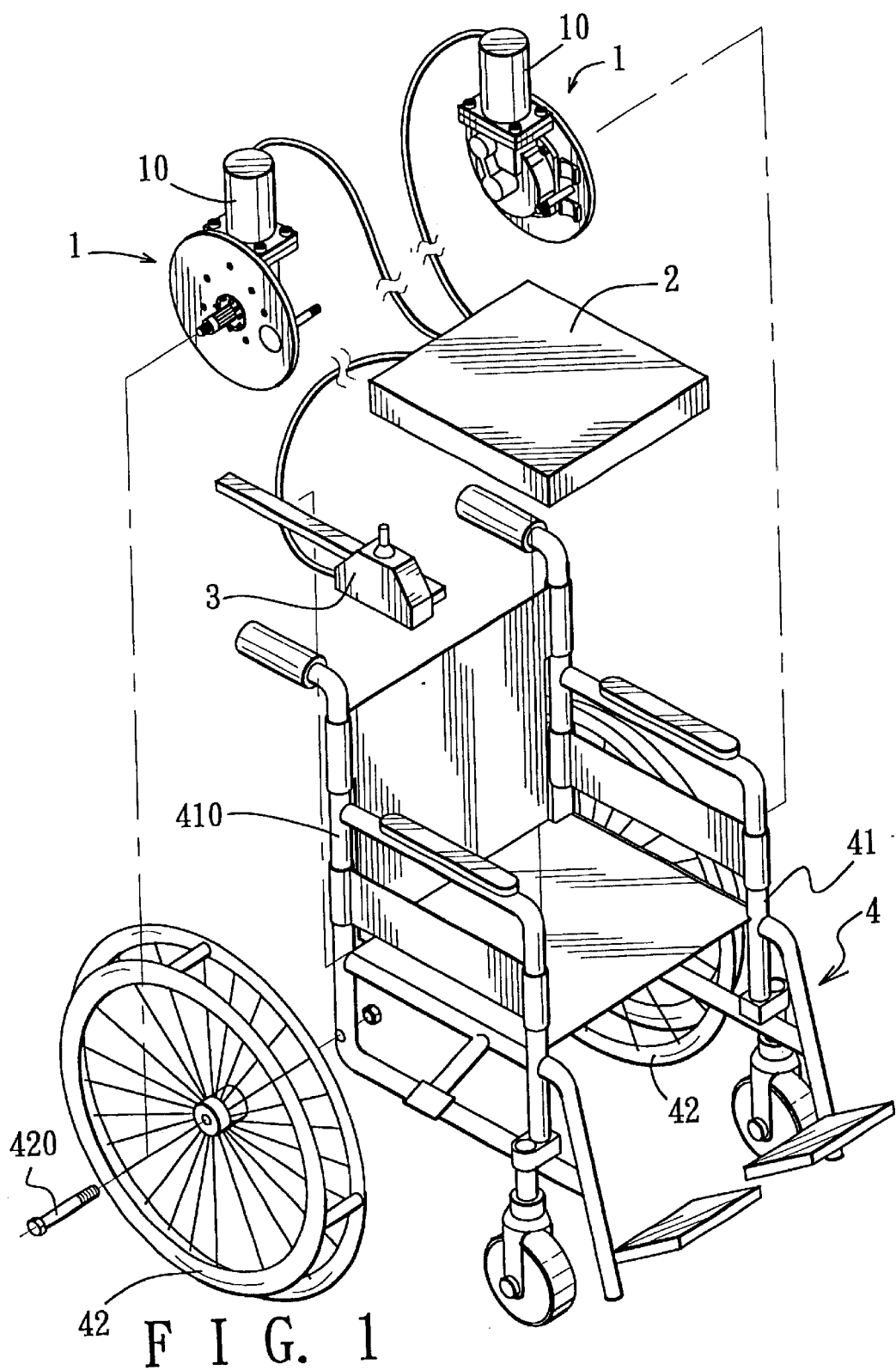
FIG. 1 is a perspective view of the preferred embodiment of an apparatus according to the invention adapted for driving a hand-operated wheelchair.

Referring to FIGS. 1 to 6, the preferred embodiment of an apparatus according to the present invention is adapted for driving electrically a hand-operated wheelchair 4. The wheelchair 4 includes a chair frame 41 that has two vertical rod portions 410 and two axle holes 411 formed through the rod portions 410, respectively, and two wheels 42 that are mounted rotatably on two opposite sides of the chair frame 41 by means of axles 420. Each of the wheels 42 has a hub 421 having two opposite sides, each of which is provided with a plurality of pairs of spokes 422 that extend therefrom. The hub 421 and each pair of the spokes 422 define cooperatively a generally triangular space thereamong in a respective one of the wheels 42.

The apparatus of the invention is shown to include two driving devices 1, a power supply device 2, and a control device 3. Each driving device 1 includes a motor unit 10 and a transmission unit. The motor unit 10 is provided with a motor shaft 101, which has a lower end face that is formed with a projection (not shown) Each of the transmission units is provided with a reduction gearing 13 and is adapted to be mounted removably on a respective one of the wheels 42 so as to transfer rotation of the motor shafts 101 to the wheels 42 in such a manner that each of the wheels 42 rotates at a speed slower than that of the respective motor shaft 101. Each driving device 1 further includes a vertical disk 11, a fastener unit adapted to attach the disk 11 removably to the chair frame 41, and a housing 12 disposed removably on the disk 11 so as to house the respective reduction gearing 13 therein, thereby retaining the respective reduction gearing 13 between the disk 11 and the housing 12. Each of the fastener units includes a horizontal threaded rod 111, an annular first clamping block 112, two second clamping blocks 113, and a cross-shaped handle 114. The threaded rod 111 is fixed to the disk 11 at an end thereof and is adapted to extend through a respective one of the axle holes 411 in the chair frame 41. The first clamping block 112 is sleeved on the threaded rod 111 and has a curved surface that is adapted to abut against a respective one of the rod portions 410 of the chair frame 41. The second clamping blocks 113 are fixed to the disk 11 one above another in such a manner that the threaded rod 111 is located between the second clamping blocks 113. The handle 114 engages threadedly the threaded rod 111 and is connected rotatably and non-movably to the first clamping block 112. In each of the fastener units, an assembly of the first clamping block 112 and the handle 114 serves as a lock nut. In addition, each of the second clamping blocks 113 has a curved surface that is adapted to abut against a respective one of the rod portions 410 of the chair frame 41 so as to clamp the respective one of the rod portions 410 between the first clamping block 112 and the second clamping blocks 113. The housing 12 of each of the driving devices 1 has an integral horizontal top plate 121 that is formed with a vertical hole 122 for extension of the respective motor shaft 101 therethrough, and four corner threaded holes 123 so that the motor units 10 are bolted on the housings 12.

The reduction gearing 13 of the transmission unit of each of the driving devices 1 includes a vertical worm 131, a worm gear 132, a small gear 133, a rotating shaft 134, an internally splined large gear 135, an externally splined horizontal driving rod 136, a coiled compression spring 137, a transverse rod 138, and a rotary lever 139. FIG. 2 shows one of the reduction gearings 13. As illustrated, the worm 131 is journalled in the housing 12 and has a top end formed with a slot 1310 for engaging fittingly the projection (not shown) of the motor shaft 101 such that the worm 131 is connected fixedly to the motor shaft 101. The worm gear 132 meshes with the worm 131 and is rotatable about a horizontal axis. The worm gear 132 and the small gear 133 are sleeved fixedly on the rotating shaft 134, which is journalled in the housing 12. The large gear 135 meshes with the small gear 132 and has a diameter that is larger than that of the small gear 132. The large gear 135 is sleeved movably and non-rotatably on the driving rod 136. The driving rod 136 is adapted to rotate a respective one of the wheels 42 (see FIG. 4) synchronously therewith, and has an outer end portion 1361 (see FIG. 4) adapted to extend through the hub 421 (see FIG. 4) of the respective one of the wheels 42 (see FIG. 4), a diameter-reduced and externally threaded end 1362 adapted to extend outwardly from the hub 421 (see FIG. 4) of the respective one of the wheels 42 (see FIG. 4), and an integral key 1363. The compression spring 137 is disposed to bias the large gear 135 to engage the small gear 132. The transverse rod 138 is journalled in the housing 12 and is formed with two aligned pushing stubs 1381 that extend radially and outwardly therefrom. The rotary lever 139 is connected fixedly to an end of the transverse rod 138 and is rotatable to rotate the pushing stubs 1381 about the transverse rod 138 so as to push and remove the large gear 135 from the small gear 132 against biasing action of the compression spring 137, thereby permitting manual operation of the wheels 42.

Figure 4:
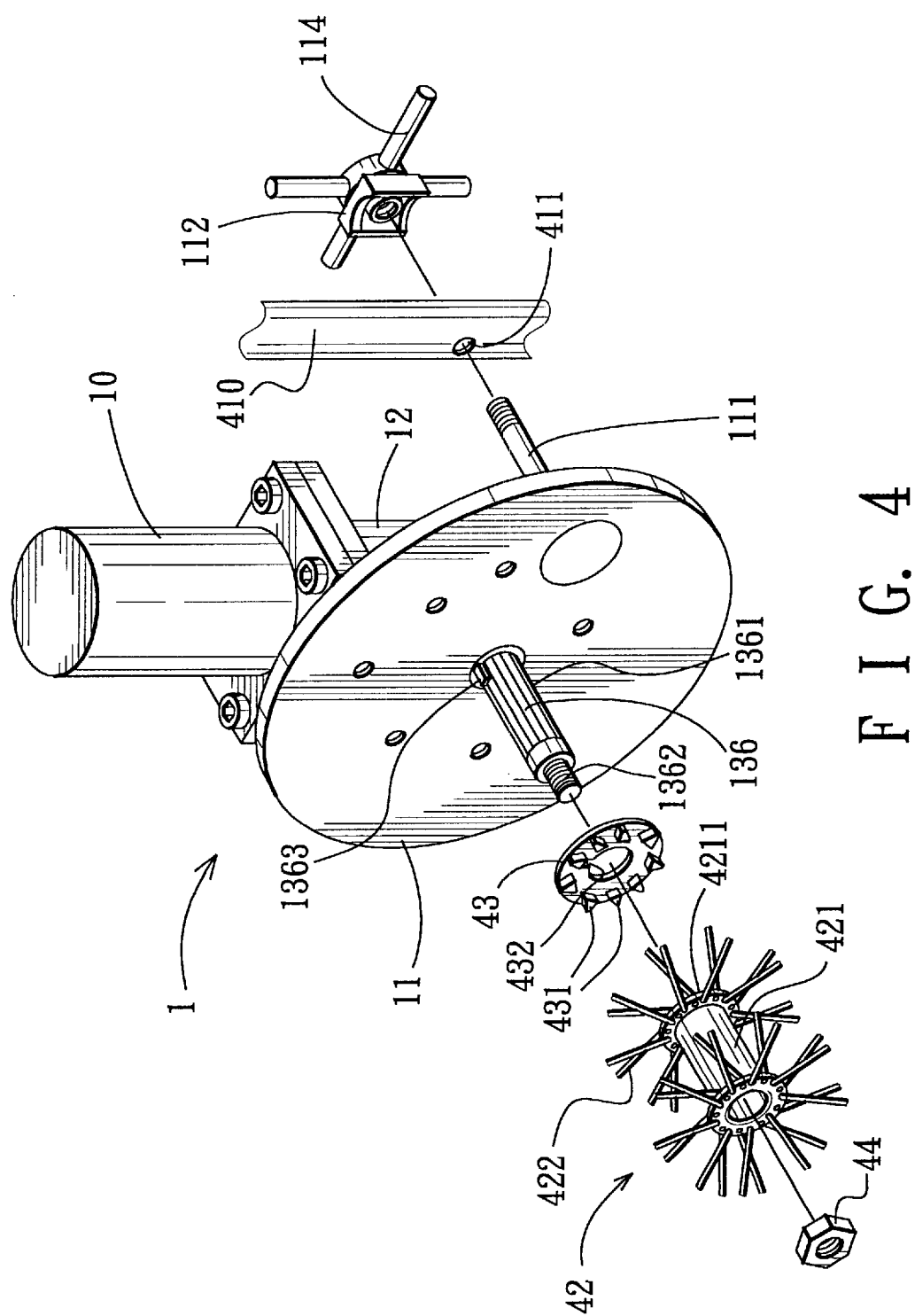
FIG. 4 is a partly exploded perspective view of the driving device of the preferred embodiment adapted for mounting on a vertical rod portion of the wheelchair.
Figure 5:
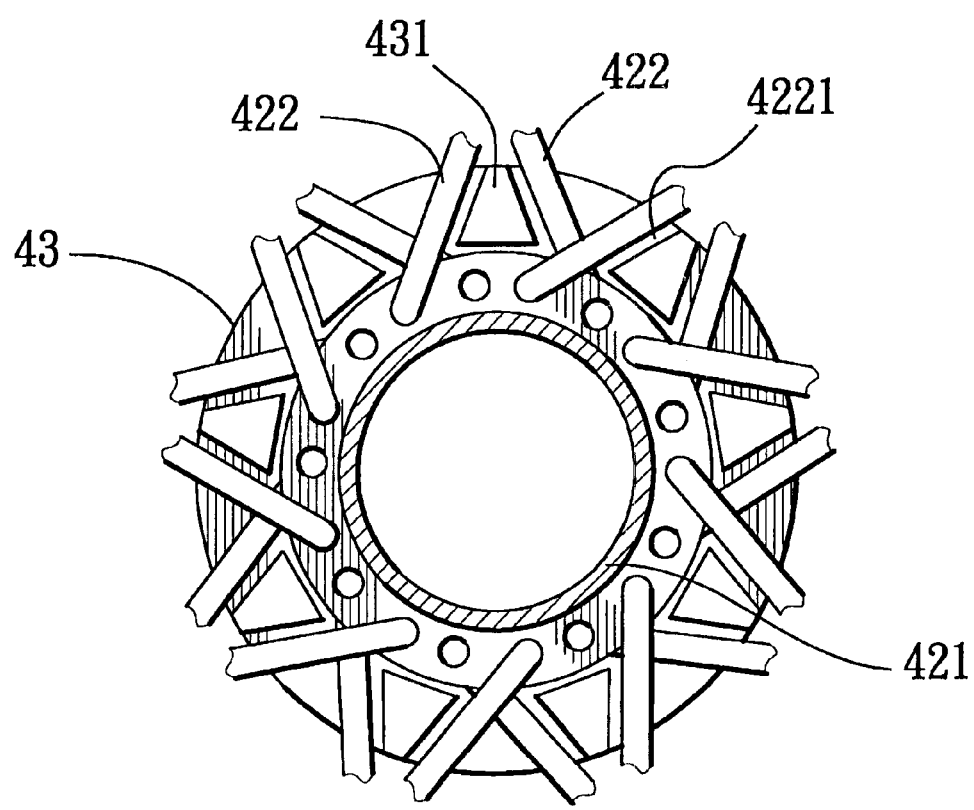
FIG. 5 is a schematic side view illustrating assembly of spokes of a wheel of the wheelchair and a ring plate of the preferred embodiment.

Referring to FIG. 4, the transmission unit of each of the driving devices 1 further includes a vertical ring plate 43 sleeved fixedly on the respective driving rod 136 and having a keyway 432 that engages the key 1363 in the respective driving rod 136 so as to prevent relative rotation therebetween, an inner side surface that abuts against the respective disk 11, and an outer side surface that is formed with a plurality of integral trapezoidal projections 431 which are adapted to engage the triangular spaces 4221 defined by the hub 421 and the spokes 422 in a respective one of the wheels 42. As illustrated, a nut 44 engages the externally threaded end 1362 of the respective driving rod 136 and is adapted to abut against the respective hub 421, thereby preventing axial movement of the ring plate 43 and the respective hub 421 on the respective driving rod 136.

Referring to FIG. 1, the power supply device 2 is adapted to be disposed on the chair frame 41 for supplying electrical power to the motor units 10 of the driving devices 1. In this embodiment, the power supply device 2 includes a rechargeable battery. Besides, the power supply device 2 may be configured as a seat pad for the wheelchair 4.

The control device 3 controls speed ratios of the motor shafts 101 of the motor units 10 of the driving devices 1 so as to be adapted to steer the wheelchair 4. In this embodiment, the control device 3 includes a swing lever. Preferably, the control device 3 is secured to an elbow rest of the wheelchair 4 to facilitate manipulation by the user.

Referring to FIGS. 1 to 6, during assembly, the wheels 42 along with the axles 420 have to be first removed from the vertical rod portions 410 of the chair frame 41. The threaded rods 111 are inserted through the axle holes 411 in the vertical rod portions 410 and through the assembly of the first clamping blocks 112 and the handles 114. The handles 114 are tightened so that each of the vertical rod portions 410 is clamped between two of the second clamping blocks 113 on the vertical disks 11 and the first clamping blocks 112. Then, the ring plates 43 and the nuts 44 are mounted on the driving rods 136. Thus, the driving devices 1 are mounted on the chair frame 41.

Figure 6:
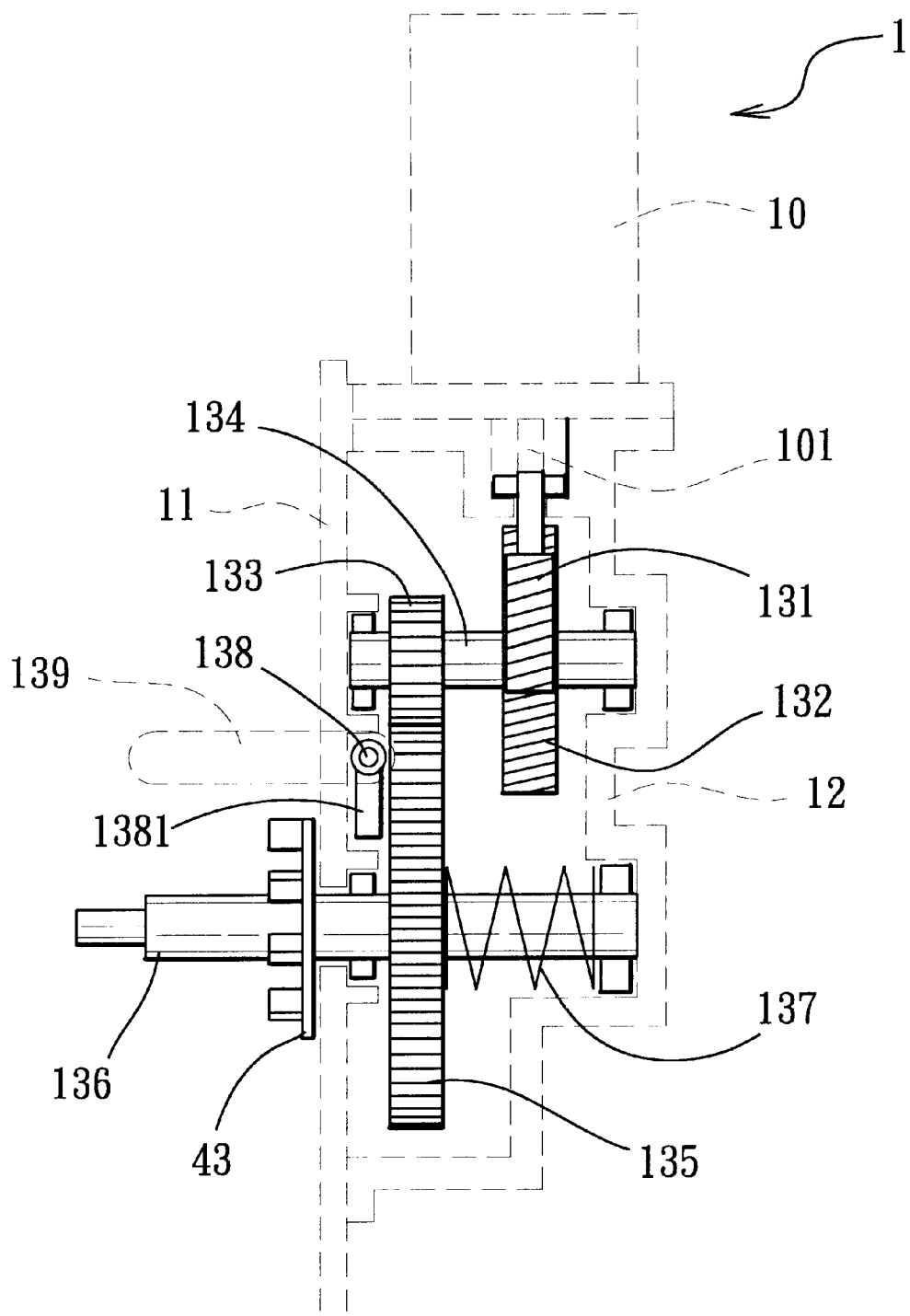
FIG. 6 is a schematic front view illustrating operation of the driving device of the preferred embodiment during operation of the wheelchair in a power mode.

With reference to FIG. 6, which illustrates a driving device 1, when power is turned on, the motor shaft 101 rotates the worm 131, which in turn rotates the worm gear 132. The worm gear 132 drives the small gear 133 to rotate synchronously therewith. The small gear 133 in turn rotates the large gear 135, which brings the driving rod 136 and the ring plate 43 engaging the wheel 42 (see FIG. 1) to rotate.

Figure 7:
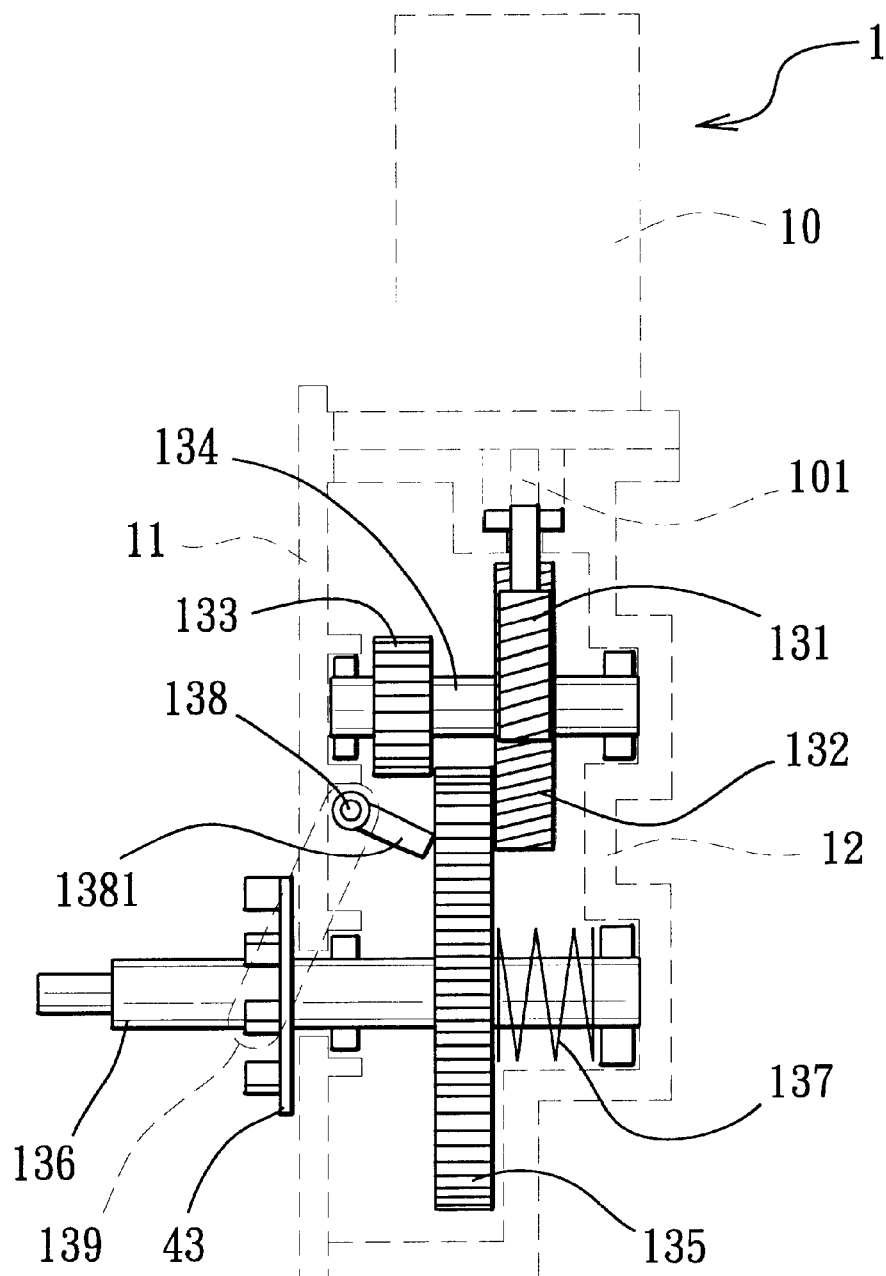
FIG. 7 is a schematic front view illustrating operation of the driving device of the preferred embodiment during operation of the wheelchair in a manual mode.

To interrupt power transmission, the rotary lever 139 is turned to bring the pushing stubs 1381 to push the large gear 135 away from the small gear 133 against the biasing action of the compression spring 137 so that the wheels 42 (see FIG. 1) are manually rotatable, as shown in FIG. 7. When it is desired to switch to the power mode once again, the rotary lever 139 is turned reversely so that the pushing stubs 1381 move away from the large gear 135. The large gear 135 will once again mesh with the small gear 133 due to the biasing action of the compression spring 137 to permit transfer of rotation from the motor shaft 101 to the wheels 42.

By virtue of the above construction, the apparatus of the invention converts a conventional hand-operated wheelchair into a power-operated one to facilitate use.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An apparatus for driving electrically a hand-operated wheelchair, the wheelchair including a chair frame that has two vertical rod portions, and two axle holes that are formed through the rod portions, respectively, and two wheels that are mounted rotatably on two opposite sides of the chair frame, each of the wheels having a hub which has two opposite sides, each of which is provided with a plurality of pairs of spokes that extend therefrom, the hub and each pair of the spokes defining cooperatively a generally triangular space thereamong in a respective one of the wheels, said apparatus comprising:

two driving devices each of which includes a motor unit that is provided with a motor shaft, and a transmission unit that is adapted to be mounted removably on a respective one of the wheels so as to transfer rotation of said motor shaft to the respective one of the wheels in such a manner that each of the wheels rotates at a speed smaller than that of the respective motor shaft;

a power supply device adapted to be disposed on the chair frame for supplying electrical power to said motor units of said driving devices; and a control device which controls speed ratios of said motor shafts of said motor units of said driving devices so as to be adapted to steer the wheelchair;

wherein said transmission unit of each of said driving devices is provided with a reduction gearing, each of said driving devices further including:

a vertical disk;

a fastener unit adapted to attach said disk removably to the chair frame; and a housing disposed removably on said disk so as to house the respective reduction gearing therein, thereby retaining the respective reduction gearing between said disk and said housing;

wherein said fastener unit of each of said driving devices includes:
- a horizontal threaded rod fixed to said disk at an end thereof and adapted to extend through a respective one of the axle holes in the chair frame;
- an annular first clamping block sleeved on said threaded rod and having a curved surface that is adapted to abut against a respective one of the rod portions of the chair frame;
- two second clamping blocks fixed to said disk one above another, said threaded rod being located between said second clamping blocks, each of said second clamping blocks having a curved surface that is adapted to abut against a respective one of the rod portions of the chair frame so as to clamp the respective one of the rod portions between said first clamping block and said second clamping blocks; and
- a cross-shaped handle engaging threadably said threaded rod and connected rotatably and non-movably to said first clamping block, assembly of said first clamping block and said handle serving as a lock nut.

2. The apparatus as claimed in claim 1, wherein said housing of each of said driving devices has an integral horizontal top plate that is formed with a vertical hole for extension of the respective motor shaft therethrough, said reduction gearing including:
- a vertical worm connected fixedly to the respective motor shaft;
- a worm gear meshing with said worm and rotatable about a horizontal axis;
- a small gear connected fixedly and coaxially to said worm gear;
- an internally splined large gear meshing with said small gear and having a diameter that is larger than that of said small gear;
- an externally splined horizontal driving rod, on which said large gear is sleeved movably and non-rotatably, said driving rod being adapted to rotate a respective one of the wheels synchronously therewith;
- a coiled compression spring for biasing said large gear to engage said small gear;
- a transverse rod journalled in said housing and formed with two aligned pushing stubs that extend radially and outwardly therefrom; and
- a rotary lever connected fixedly to an end of said transverse rod and rotatable to rotate said pushing stubs about said transverse rod so as to push and remove said large gear from said small gear against biasing action of said compression spring, thereby permitting manual operation of the wheels.

3. The apparatus as claimed in claim 2, wherein said reduction gearing further includes a rotating shaft, on which the respective worm gear and the respective small gear are sleeved fixedly.

4. The apparatus as claimed in claim 2, wherein said driving rod has an outer end portion that is adapted to extend through the respective hub, a diameter-reduced and externally threaded end that is adapted to extend outwardly from the respective hub, and an integral key, said transmission unit further including:
- a vertical ring plate sleeved fixedly on the respective driving rod and having a keyway that engages said key in the respective driving rod so as to prevent relative rotation therebetween, an inner side surface that abuts against the respective disk, and an outer side surface that is formed with a plurality of integral trapezoidal projections each adapted to engage the triangular space in the respective one of the wheels; and
- a nut engaging said externally threaded end of the respective driving rod and adapted to abut against the respective hub, thereby preventing axial movement of said ring plate and the respective hub on the respective driving rod.

5. The apparatus as claimed in claim 1, wherein said control device includes a swing lever.

6. The apparatus as claimed in claim 1, wherein said power supply device includes a rechargeable battery.

* * * * *